United States Patent [19] [11] 4,242,484
Suzuki et al. [45] Dec. 30, 1980

[54] VINYLIDENE CHLORIDE COPOLYMER AS A MATERIAL FOR PRODUCTION OF PACKAGING ARTICLES

[75] Inventors: Akira Suzuki, Shibukawa; Akira Ishida, Harahigashi; Masao Oya, Tokyo, all of Japan

[73] Assignees: Nippon Zeon Co., Ltd.; Kanto Denka Kogyo Co., Ltd., both of Tokyo, Japan

[21] Appl. No.: 27,057

[22] Filed: Apr. 4, 1979

[30] Foreign Application Priority Data

Apr. 8, 1978 [JP] Japan .................................. 53-41476

[51] Int. Cl.$^3$ .................... C08F 214/06; C08F 214/08
[52] U.S. Cl. .................................................. 526/273
[58] Field of Search .......................................... 526/273

[56] References Cited

U.S. PATENT DOCUMENTS

| | | | |
|---|---|---|---|
| 3,175,926 | 3/1965 | Hahn et al. | 526/273 |
| 4,041,235 | 8/1977 | Suzuki et al. | 526/273 |

FOREIGN PATENT DOCUMENTS 1030489 5/1966 United Kingdom.

Primary Examiner—Harry Wong, Jr.
Attorney, Agent, or Firm—Wenderoth, Lind & Ponack

[57] ABSTRACT

A vinylidene chloride copolymer is provided which can give packaging articles such as films, sheets, containers and tubes having superior appearance, heat stability and gas-barrier property and sufficient strength for practical application. The vinylidene chloride copolymer is derived from (1) 70 to 95% by weight of vinylidene chloride, (2) 0.5 to 10% by weight of glycidyl methacrylate, (3) 0.05 to 3% by weight of methyl acrylate or methyl methacrylate, and (4) 5 to 25% by weight of another copolymerizable vinyl monomer.

1 Claim, No Drawings

VINYLIDENE CHLORIDE COPOLYMER AS A MATERIAL FOR PRODUCTION OF PACKAGING ARTICLES

This invention relates to a vinylidene chloride copolymer suitable for production of packaging articles. More specifically, the invention relates to a semi-hard vinylidene chloride copolymer having superior appearance, heat stability, gas-barrier property and moldability and sufficient strength for practical application.

Since a vinylidene chloride resin has good gas-barrier property to any such gases as water vapor, oxygen and carbond dioxide, it is industrially important as a material for films and containers for packaging foodstuffs, pharmaceuticals and cosmetics. This resin, however, is difficult to fabricate because its softening point is high and close to its decomposition point. It has been the general practice therefore to add heat stabilizers, plasticizers, etc. to a vinylidene chloride copolymer obtained by copolymerizing vinylidene chloride with a copolymerizable vinyl monomer such as vinyl chloride, vinyl acetate or acrylonitirile in order to prevent its thermal decomposition, and such a mixture has been used as a material for the production of packaging articles. For example, compositions comprising 100 parts by weight of a copolymer composed of about 85 to 90% by weight of vinylidene chloride and the remainder being vinyl chloride, 2 to 5 parts by weight of a heat stabilizer such as epoxidized soybean oil, 2 to 5 parts by weight of a plasticizer such as dibutyl sebacate or butyl phthalyl butyl glycolate and a suitable amount of other additives such as light stabilizer, are generally used as materials for the production of packaging articles such as films, sheets, tubes and containers.

However, these conventional packaging articles have undesirable properties. For example, they give off an oily smell ascribable to the additives, and the additives tend to bleed out from the resin. Furthermore, because of the inclusion of additives, they have poor gas-barrier property. The aforesaid vinylidene chloride copolymer further has the disadvantage that the draw-down of a parison (tubular melt from an extruder) at the time of molding is large, and its direct blow molding is impossible. For this reason, it is the current practice to quench the parison to 40° C. or below, and inflate or blow it either as such or after sketching it. This method also has various defects. For example, the cost of fabrication is high, and when producing containers, a joining portion such as a bottom must be heat-welded, and containers of complex shapes cannot be produced.

The present inventors previously suggested a copolymer of vinylidene chloride and glycidyl methacrylate as a resin having superior heat stability and gas-barrier property (Japenese Laid-Open Patent Publication No. 17953/76). However, this resin is still unsatisfactory with regard to the draw-down of the parison.

It is an object of this invention therefore to provide a material capable of giving packaging articles having superior heat stability and gas-barrier property and sufficient strength for practical application by reducing the draw-down of the parison associated with the copolymer disclosed in the aforesaid Japanese Laid-Open Patent Publication No. 17953/76 without degrading the superior properties of the aforesaid copolymer and while rather improving these properties further.

According to this invention, there is provided, as a resin capable of achieving the above object, a vinylidene chloride copolymer comprising as constituent monomeric units (1) 70 to 95% by weight of vinylidene chloride, (2) 0.5 to 10% by weight of glycidyl methacrylate, (3) 0.05 to 3% by weight of methyl methacrylate or methyl acrylate, and (4) 5 to 25% by weight of another copolymerizable vinyl monomer.

Surprisingly, this copolymer has better appearance, heat stability and gas-barrier property than the copolymer disclosed in the above-cited Japanese Laid-Open Patent Publication No. 17953/76.

It is essential that the vinylidene chloride copolymer of this invention consists of the aforesaid monomeric units (1) to (4) in the indicated proportions. A copolymer comprising less than 70% by weight of the vinylidene chloride unit (1) has reduced gas-barrier property, and a copolymer comprising more than 95% by weight of the vinylidene chloride unit (1) loses its moldability. The especially preferred amount of the vinylidene chloride unit (1) is from 80 to 90% by weight. A copolymer comprising less than 0.5% by weight of the glycidyl methacrylate unit (2) has inferior heat stability, and a copolymer comprising more than 10% by weight of the unit (2) has reduced gas-barrier property. A copolymer comprising less than 0.05% by weight of the methyl methacrylate or methyl acrylate unit (3) does not have sufficient hardness, and the draw-down of the parison increases so that direct blowing cannot be performed. A copolymer comprising more than 3% by weight of the unit (3) has increased hardness and is difficult to mold, and also has reduced gas-barrier property.

Examples of the other copolymerizable vinyl monomer (4) are vinyl chloride, acrylonitirile, and vinyl esters such as vinyl acetate. Vinyl chloride is most preferred. A copolymer comprising less than 5% by weight of the vinyl monomer unit (4) has poor heat stability, and a copolymer comprising more than 25% by weight of the monomeric unit (4) has inferior gas-barrier property.

The vinylidene chloride copolymer is produced by a conventional known method such as emulsion polymerization or preferably suspension polymerization. In the case of the latter, the suitable polymerization temperature is 35° to 65° C., preferably 40° to 60° C., although this temperature is not critical. As a polymerization initiator, a peroxide such as lauroyl peroxide, an azo compound sucn as 2,2'-azobisisobutyronitrile, and diisopropylperoxy dicarbonate (a low-temperature active initiator) are used conveniently. The amount of the initiator is generally about 0.05 to 1.0 part by weight per 100 parts by weight of the monomers.

Since the vinylidene chloride copolymer of this invention has superior heat stability, it can be directly extruded without adding a heat stabilizer. However, as required, small amounts of conventional additives such as lubricants or light stabilizers may be incorporated. The superior gas-barrier property of the copolymer of this invention is attributed presumably to the fact that no additive needs to be incorporated, and even if it is to be added, its amount can be small.

There is no particular restrictions on the method of molding. Preferably, extrusion-molding machines for vinylidene chloride resins are used. However, because the copolymer of this invention has good heat stability, general extrusion-molding machines for vinyl chloride resins can also be used.

The vinylidene chloride copolymer of this invention is molded into films and sheets by a T-die method, an inflation method, etc., and into containers and tubes by a blow molding method, etc. These molded articles, either alone or together with other resins, are used for packaging foodstuffs, pharmaceuticals, cosmetics, etc. One great advantage of the copolymer of this invention is that it can be molded into containers and tubes by a direct blow technique.

The following examples specifically illustrate the present invention.

EXAMPLE

The monomers indicated in the table below were charged into a 50-liter autoclave at 20° C., and were mixed uniformly. To the mixture was added a solution of 40 gr of azobisisobutyronitrile as an initiator in 1 kg of vinylidene chloride/vinyl chloride mixture (in the mixing ratio shown in the table). The mixture was well stirred, and then a solution of 16 g of carboxylmethyl cellulose in 32 kg of pure water was added. The mixture was again stirred, and heated and maintained at 60° C. While, as required, heating and cooling were performed, the polymerization reaction was carried out in a closed system. In about 20 hours, copolymers of the indicated compositions were obtained in the yields indicated.

The polymerization reaction in Runs Nos. 3 to 10 was performed under a fixed pressure. Specifically, the reaction system was maintained at the pressures indicated in the table, and when the pressure rose as a result of the reaction, the increase of pressure was released by means of a pressure releasing valve, thereby to maintain the pressure constant.

100 Parts by weight of each of the resins obtained was mixed with 3.3 parts by weight of a lubricant and 0.5 part by weight of a light stabilizer to form a compound. The compound was directly blown by a blow molding machine for vinyl chloride resins. The properties of the molded articles are shown in the table.

It is seen from the table that the vinylidene chloride copolymers of this invention (Runs Nos. 1 to 7) are superior to conventional copolymers in regard to heat stability, direct blowability, appearance, odor, gas-barrier property and resistence to moisture permeation.

The copolymer obtained in Run No. 1 was subjected to a flow test on a Koka-type flow tester under the following conditions: orifice diameter 1 mm, orifice length 1 mm, pressure 100 kg/cm$^2$. It was found that the resin began to flow at 135° C. and the flowing ended at 143° C.

The properties tabulated were determined by the following methods.

(1) Draw-down

The time ($t_1$) required for the parison to fall 10 cm from the nozzle outlet and the time ($t_2$) required for the parison to fall 20 cm from the 10 cm-point were measured, and the $t_1/t_2$ ratio was calculated. This ratio is higher as the draw-down is larger.

(2) Heat Stability

A commercially available vinylidene chloride resin (a copolymer composed of 85 to 95% by weight of vinylidene chloride and 15 to 5% by weight of vinyl chloride; containing 10% by weight, based on the copolymer, of a heat stabilizer, a plasticizer and other additives) was intimately melt-adhered by a press, to a thickness of 200 to 300 microns, to a test piece made of SUS 304 stainless steel (1.5 cm wide, 4.5 cm long, 0.4 mm thick). The test piece was then placed in a Geer oven at 160° C. for 5 minutes, 10 minutes, 20 minutes, and 30 minutes. Then, the adhering resin was peeled from the test piece, and the state of its coloration was observed. The results obtained were as follows:

| Heating time (minutes) | State of coloration |
| --- | --- |
| 0 | Clear and slightly yellowish |
| 5 | Pale ochre |
| 10 | Pale yellow brown |
| 20 | Dark brown to reddish brown |
| 30 | Reddish brown |

On the other hand, the same test as above was performed on the vinylidene chloride copolymers obtained in the Runs shown in the table, and the heat stability of each of these samples was evaluated by comparing the state of its coloration with that of the commerically available vinylidene chloride resin sample.

(3) Oxygen Permeability

Measured by ASTM D-1434 (1966). The measured value was calculated for a film having a thickness of 10 microns.

(4) Moisture Permeability

Measured by JIS Z-0208, and the measured value was calculated for a film having a thickness of 100 microns.

TABLE

| | Run No. | Invention | | | | | | | Comparison | | |
| --- | --- | --- | --- | --- | --- | --- | --- | --- | --- | --- | --- |
| | | 1 | 2 | 3 | 4 | 5 | 6 | 7 | 8 | 9 | 10 |
| Monomers charged (kg) | Vinylidene chloride | 12.45 | 12.45 | 11.25 | 11.06 | 11.40 | 11.03 | 12.0 | 10.66 | 10.97 | 10.97 |
| | Vinyl chloride | 2.15 | 2.15 | 2.35 | 3.60 | 3.12 | 3.64 | 2.43 | 4.02 | 4.03 | 4.03 |
| | Glycidyl methacrylate | 0.32 | 0.32 | 0.32 | 0.32 | 0.32 | 0.32 | 0.32 | 0.32 | — | — |
| | Methyl methacrylate | 0.08 | — | 0.08 | 0.016 | 0.16 | 0.008 | 0.25 | — | — | — |
| | Methyl acrylate | — | 0.08 | — | — | — | — | — | — | — | — |
| | Divinylbenzene | — | — | — | — | — | — | — | — | — | 0.08 |
| Monomers in the initiator solution (kg) | Vinylidene chloride | 0.83 | 0.83 | 0.75 | 0.76 | 0.76 | 0.73 | 0.8 | 0.7 | 0.73 | 0.73 |
| | Vinyl chloride | 0.17 | 0.17 | 0.25 | 0.24 | 0.24 | 0.27 | 0.2 | 0.3 | 0.27 | 0.27 |
| Pressure at the time of pressure releasing (kg/cm$^2$ . G) | | — | — | 4.8 | 4.9 | 4.6 | 4.9 | 4.2 | 4.2 | 5.1 | 5.1 |
| Yield of copolymer (kg) | | 12.3 | 11.6 | 11.54 | 9.25 | 11.36 | 11.62 | 11.46 | 11.5 | 10.88 | 11.90 |
| Copolymer composition (wt. %) | Vinylidene chloride | 83.1 | 83.5 | 83.1 | 82.9 | 83.4 | 84.2 | 85.1 | 83.3 | 84.0 | 83.8 |
| | Vinyl chloride | 13.6 | 13.0 | 13.4 | 13.4 | 12.4 | 13.03 | 9.9 | 13.9 | 16.0 | 15.5 |
| | Glycidyl methacrylate | 2.6 | 2.8 | 2.8 | 3.5 | 2.8 | 2.7 | 2.8 | 2.8 | — | — |
| | Methyl methacrylate | 0.7 | — | 0.7 | 0.2 | 1.4 | 0.07 | 2.2 | — | — | — |

TABLE-continued

|  | Invention | | | | | | | Comparison | | |
|---|---|---|---|---|---|---|---|---|---|---|
| Run No. | 1 | 2 | 3 | 4 | 5 | 6 | 7 | 8 | 9 | 10 |
| Methyl acrylate | — | 0.7 | — | — | — | — | — | — | — | — |
| Divinylbenzene | — | — | — | — | — | — | — | — | — | 0.7 |

*Calculated from the amounts of the unreacted monomers.

TABLE

| | | Invention | | | | | | | Comparison | | |
|---|---|---|---|---|---|---|---|---|---|---|---|
| | Run No. | 1 | 2 | 3 | 4 | 5 | 6 | 7 | 8 | 9 | 10 |
| | Draw-down | 1.03–1.07 | 1.1–1.2 | 1.0–1.05 | 1.05–1.1 | 1.0–1.05 | 1.1–1.2 | 1.0–1.05 | 1.6–1.7 (Direct blow impossible) | 1.6–1.7** (Direct blow impossible) | 1.4–1.5** |
| Properties of the molded article | Heat stability | Very good | Very good | Very good | Very good | Good | Good | Good | Good | Poor | Poor |
| | Appearance | Pale yellow, clear | Pale yellow, clear | Pale yellow, clear | Pale yellow, clear | Pale yellow, semi-transparent | Pale yellow, clear | Pale yellow, semi-transparent | Yellow, clear | Yellowish brown, clear** | Yellowish brown, clear** |
| | Odor | No | No | No | No | No | No | No | No | Yes | Yes |
| | Oxygen permeability [cc/m². hr . atm (at 20° C.)] | 0.5 | 0.5 | 0.5 | 0.5 | 0.5 | 0.5 | 0.6 | 0.6 | 2.2*** | 15.3*** |
| Moisture permeability [g/m². 24 hrs (at 40° C., RH 90%→0%] | | 0.4 | 0.4 | 0.4 | 0.4 | 0.4 | 0.4 | 0.5 | 0.5 | 1.2 | 9.6 |

**Decomposition occurred within a short period of time, and therefore, the measured values and the results of observation were those at the early stage of molding.
***Measured on a film prepared by adding 8 parts by weight, in total, of a commercially available epoxy-type heat stabilizer, a lubricant and a light stabilizer to 100 parts by weight of the resin.

What we claim is:

1. A molding composition for the production of packaging articles, which is usable in a direct blow molding process, said composition containing a vinylidene chloride copolymer prepared by suspension polymerization and comprising as constituent monomeric units (1) 70 to 90% by weight of vinylidene chloride,
(2) 0.5 to 10% by weight of glycidyl methacrylate,
(3) 0.05 to 3% by weight of methyl methacrylate, and the balance
(4) 5 to 25% by weight of vinyl chloride.

* * * * *